United States Patent Office 3,065,239
Patented Nov. 20, 1962

3,065,239
NOVEL 16-HALOMETHYL STEROIDS AND PROCESSES
Norman L. Wendler, Summit, and David Taub, Metuchen, N.J., assignors to Merck & Co., Inc., Rahway, N.J., a corporation of New Jersey
No Drawing. Filed July 6, 1960, Ser. No. 41,036
20 Claims. (Cl. 260—397.45)

This invention relates to novel steroid compounds. More specifically, this invention relates to $\Delta^{15}$-16-haloalkyl and 16-haloalkylidene compounds of the 17-oxygenated pregnadienone and pregnatrienone type. Such compounds are defined by the following formula:

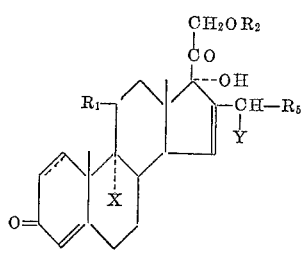

and

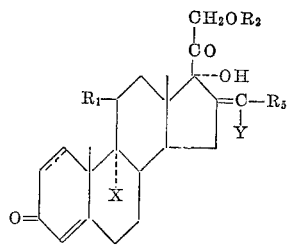

in which $R_1$ may be β-hydroxyl or keto, $R_2$ may be hydrogen or lower alkanoyl, X may be hydrogen or halogen, Y is halogen, $R_5$ may be hydrogen or alkyl and the dotted line between carbons 1 and 2 indicates that there may be either a single or a double bond between those two carbons.

These new steroids of our invention possess extra high anti-inflammatory activity considerably greater than that of the parent steroids. They are especially effective for the treatment of arthritis and related diseases since they can be administered for their cortisone-like action in low dosage thereby minimizing undesired side effects.

The compounds of our invention are prepared from the corresopnding 16α and 16β alkyl steroids by a series of reactions which are shown in the schematic chemical flow sheet of Table 1. The details of the reaction shown in this flow sheet are to be found in the examples and the definitions of the various alternative groups are shown at the bottom of the table.

TABLE 1

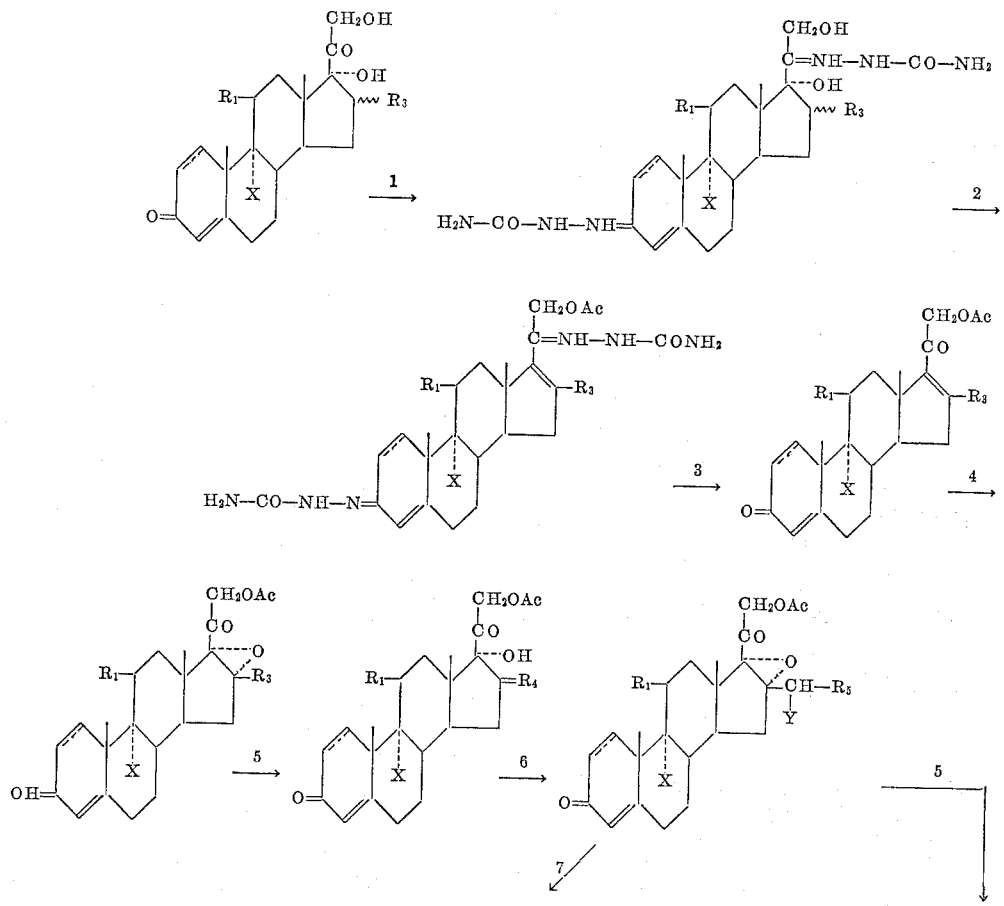

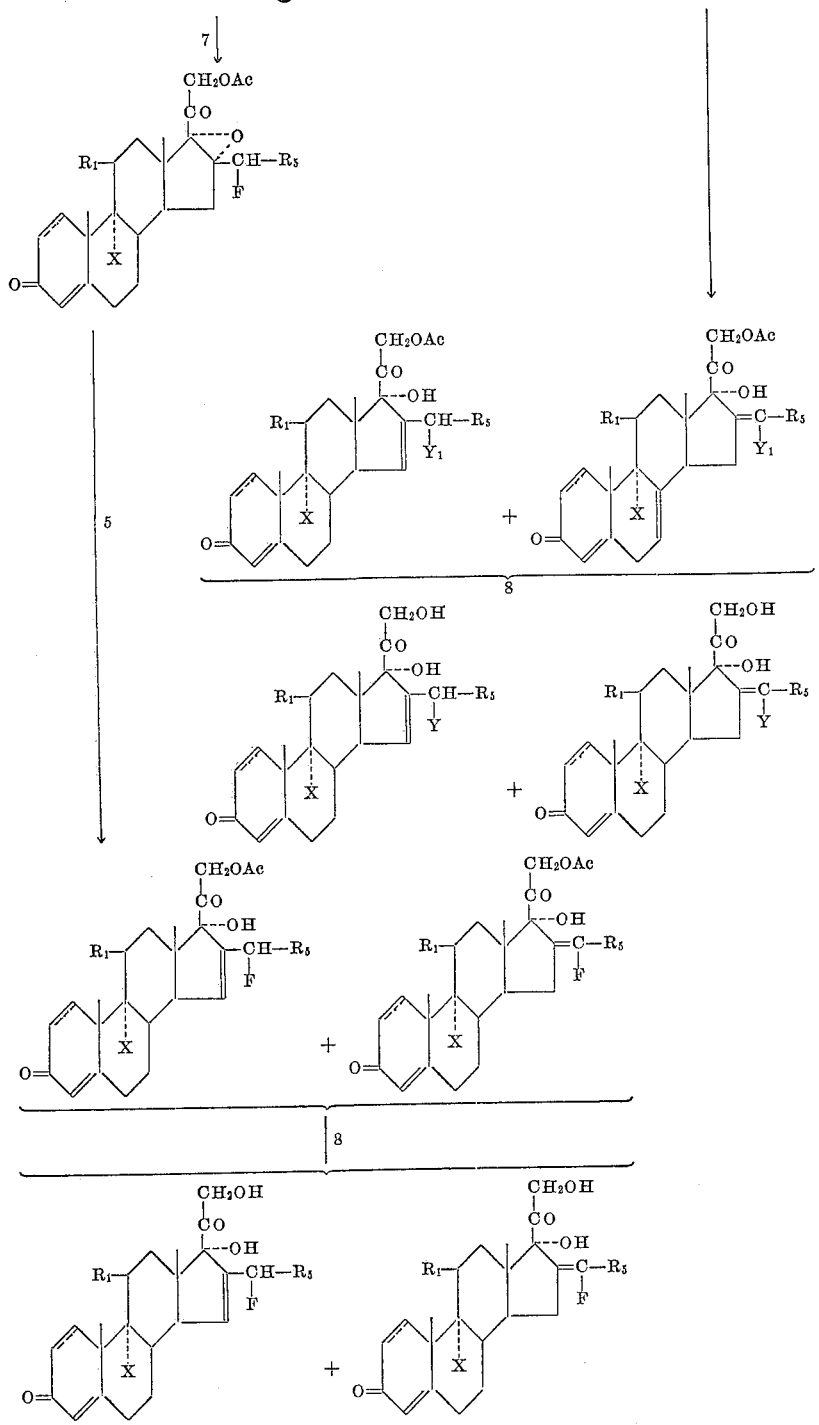

Definitions:
  R₁=hydroxy or keto
  R₃=alkyl
  R₄=alkylidene of same number of carbons as R₃
  R₅=alkyl one carbon less than R₃ or H if R₃ is methyl
  X=hydrogen or halogen
  Y₁=Br or Cl
  Ac=acetyl (other lower alkanoyl groups could also be used)
Reactants:
  1=semicarbazide base plus hydrochloride
  2=acetic acid plus acetic anhydride
  3=hot aqueous acetic acid
  4=an organic peracid
  5=strong acid (e.g., HBr, HCl, HF, HClO₄, CF₃COOH, etc.)
  6=N-bromosuccinamide or N-chlorosuccinamide
  7=AgF
  8=acid or base hydrolysis In general, the starting materials for the preparation of the compounds of our invention are 16α or 16β alkyl-11-oxygenated-17α,21-dihydroxy-4 pregnene-3,20 - diones and 11-oxygenated-17α, 21-dihydroxy-1,4-pregnadiene-3,20-diones, in which the substituent on carbon 11 is either a keto or a β-hydroxyl and in which the carbon 9 has either α-hydrogen or α-halogen. These starting materials are known compounds such as: 9α-fluoro-11β,17α,21-trihydroxy-16α-methyl-1,4-pregnadiene - 3,20 - dione; 9α-fluoro-11β,17α,21-trihydroxy - 16β-methyl - 1,4 - pregnadiene - 3,20-dione; 11β,17α,21-trihydroxy-16α - methyl-1,4-pregnadiene-3,20-dione; 11β,17α,21-trihydroxy - 16β- methyl-1,4-pregnadiene - 3,20-dione; 17α,21-dihydroxy-16α-methyl-1,4-pregnadiene - 3,11,20-trione; 17α, 21 - dihydroxy-16β-methyl-1,4-pregnadiene-3,11,20 - trione; 9α-fluoro-11β,17α,21-trihydroxy - 16α - methyl-4-pregnene-3,20-dione; 9α-fluoro-11β,17α,21-trihydroxy - 16β-methyl-4-pregnene-3,20 - dione; 11β,17α,21-trihydroxy - 16α-methyl-4-pregnene - 3,20 - dione; 11β,17α,21 - trihydroxy-16β-methyl - 4 - pregnene-3,20-dione; 17α,21-dihydroxy-16α-methyl-4-pregnene-3,11,20-trione; 17α,21-dihydroxy-16β-methyl-4-pregnene - 3,11,20-trione; 9α-bromo-17α, 21-dihydroxy-16α-methyl-4-pregnene - 3,11,20 - trione; 9α-chloro-17α,21-dihydroxy-16α-methyl - 4 - pregnene-3,11,20-trione, and the like as well as the corresponding 16α and 16β ethyl, propyl, and butyl compounds.

The intermediates in the reaction scheme shown in Table 1 are claimed elsewhere. The novel steps and the products of this invention start in the reaction scheme with the reaction number 6, the reaction with N-bromo-succinimide.

In general, in the products of our invention, $R_1$ in the general formula can thus be a keto or a β-hydroxy. $R_2$ can be hydrogen or alkanoyl. $R_3$ in the starting material is alkyl, preferably methyl. $R_5$ is hydrogen or alkyl, preferably hydrogen. The alkanoyl group on the $C_{21}$ hydroxyl is preferably acetyl as shown by the group Ac in the schematic flow sheet. It may, however, be any other convenient lower alkanoyl group. The α substituent on $C_9$ may be either hydrogen or an α-halogen. Various 9α halogen substances of the starting materials such as the 9α bromo, chloro, and preferably the fluoro derivatives are known.

The Δ$^{15}$-16-haloalkyl and 16-haloalkylidene steroids of our invention, which possess extremely high anti-inflammatory activity, may be administered orally, parenterally or topically. Thus, the active ingredient can be administered alone or may be associated with a carrier. A smaller quantity of the active Δ$^{15}$-haloalkyl and 16-haloalkylidene steroids may be administered to the patient and have the same therapeutic effect as larger quantities of other steroids such as cortisone or hydrocortisone. Any of the carriers used in pharmaceutical practice may be employed where there is no incompatibility with the active materials. The composition may take the form of tablets, powders, capsules, elixirs, syrups or other dosage forms which are particularly useful for oral ingestion. Liquid diluents are employed in sterile condition for parenteral use, namely, by injection. Such a medium may be a sterile solvent for the active material. For topical administration any of the known dermatologic vehicles may be employed. Such vehicles for external application include water-soluble ointment bases, oils, petrolatum and jellies.

The invention can be illustrated by the following examples:

*Example 1*

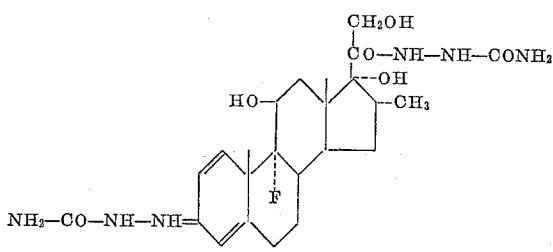

A mixture of 1.00 g. of 9α-fluoro-11β,17α,21 - trihydroxy-16α-methyl-1,4-pregnadiene-3,20-dione, 750 mg. of semicarbazide base, 280 mg. of semicarbazide hydrochloride in 20 ml. of methanol and 10 ml. of dimethylformamide is refluxed for 20 hours under nitrogen. The mixture is cooled to 20° C. and 100 ml. of water is added with stirring. The precipitated 3,20-disemicarbazone of 9α-fluoro-11β,17α,21-trihydroxy-16α-methyl - 1,4 - pregnadiene-3,20-dione is filtered, washed with water, and dried in air.

When the correspondingly substituted compounds are substituted for the fluoro-trihydroxy-methyl-pregnadienedione in the above procedure, there are prepared the 3,20-disemicarbazone of 9α-fluoro-11β,17α,21-trihydroxy-16β-methyl-1,4-pregnadiene-3,20-dione, 3,20-disemicarbazone of 11β,17α,21-trihydroxy-16α-methyl-1,4 - pregnadiene-3,20-dione; 3,20-disemicarbazone of 11β,17α,21-trihydroxy-16β-methyl-1,4-pregnadiene - 3,20-dione; 3,20-disemicarbazone of 17α,21-dihydroxy - 16α - methyl - 1,4-pregnadiene-3,11,20-trione; 3,20-disemicarbazone of 17α, 21-dihydroxy-16β-methyl-1,4-pregnadiene - 3,11,20 - trione; 3,20-disemicarbazone of 9α - fluoro - 11β,17α,21-trihydroxy-16α - methyl-4-pregnene-3,20-dione; 3,20-disemicarbazone of 9α-fluoro - 11β,17α,21 - trihydroxy-16β-methyl - 4 - pregnene-3,20-dione; 3,20-disemicarbazone of 11β,17α,21-trihydroxy - 16α - methyl - 4 - pregnene-3,20-dione; 3,20 - disemicarbazone of 11β,17α,21 - trihydroxy-16β-methyl-4-pregnene-3,20-dione; 3,20-disemicarbazone of 17α,21-dihydroxy - 16α - methyl - 4 - pregnene - 3,11, 20-trione and 3,20-disemicarbazone of 17α,21-dihydroxy-16β-methyl-4-pregnene-3,11,20-trione and the like.

*Example 2*

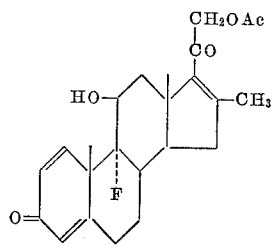

A solution of 500 mg. of the 3,20-disemicarbazone of 9α - fluoro-11β,17α,21-trihydroxy-16α-methyl-1,4-pregnadiene-3,20-dione in 10 ml. of acetic acid and 0.5 ml. acetic anhydride is refluxed under nitrogen for one hour to produce the corresponding 3,20-disemicarbazone of 11β,21 - dihydroxy - 16 - methyl - 1,4,16 - pregnatriene-3, 20-dione 21-acetate. The reaction mixture is cooled, 13 ml. of water is added and the mixture heated on the steam bath for 5 hours. It is then concentrated in vacuo nearly to dryness and water and chloroform added. The mixture is thoroughly extracted with chloroform, and the chloroform extract washed with excess aqueous potassium bicarbonate, saturated salt solution and dried over magnesium sulfate. Chromatography of the residue on neutral alumina and crystallization of pertinent benzene-chloroform fractions gives 9α-fluoro-11β,21-dihydroxy-16-methyl-1,4,16-pregnatriene-3,20-dione 21-acetate.

Similar treatment of the 3,20-disemicarbazone of 9α-fluoro - 11β,17α,21 - trihydroxy - 16β - methyl - 1,4 - pregnadiene-3,20-dione also leads to 9α-fluoro-11β,21-dihydroxy-16-methyl-1,4,16-pregnatriene-3,20-dione 21-acetate.

In a similar manner 11β,21-dihydroxy-16-methyl-1,4, 16 - pregnatriene - 3,20-dione 21-acetate; 21-hydroxy-16-methyl-1,4,16-pregnatriene-3,11,20-trione 21-acetate; 9α-fluoro - 11β,21 - dihydroxy - 16 - methyl - 4,16 - pregnadiene-3,20-dione 21-acetate; 11β,21-dihydroxy-16-methyl-4,16-pregnadiene-3,20-dione 21-acetate; and 21-hydroxy-16-methyl-4,16-pregnadiene-3,11,20-trione 21-acetate are obtained by substitution of the correspondingly substituted 3,20-disemicarbazone for the starting material in the above procedure.

When propionic acid and anhydride are substituted for the acetic acid and anhydride in the above procedure, the product is the corresponding 21-propionate of the steroid obtained.

Example 3

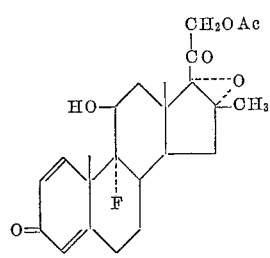

To a stirred solution of 500 mg. of 9α-fluoro-11β,21-dihydroxy - 16 - methyl - 1,4,16 - pregnatriene - 3,20-dione 21-acetate in 15 ml. of methylene chloride at 0° C. are added 8 g. of disodium hydrogen phosphate and 2 ml. of 2 M peroxytrifluoracetic acid in methylene chloride. After 10 minutes at 0° C. and 25° for one hour, water is added and the mixture thoroughly extracted with methylene chloride.

The latter extract is washed with saturated aqueous sodium chloride and dried over magnesium sulfate. Evaporation of the solvent and crystallization of the residue from acetone-ether gives 9α-fluoro-11β,21-dihydroxy-16β-methyl-16α,17α-oxido-1,4-pregnadiene-3,20-dione 21-acetate.

In a similar manner are prepared 11β,21-dihydroxy-16β-methyl-16α,17α-oxido-1,4-pregnadiene-3,20-dione 21-acetate; 21-hydroxy-16β-methyl-16α,17α-oxido-1,4-pregnadiene - 3,11,20 - trione 21-acetate; 9α-fluoro-11β,21-dihydroxy - 16β - methyl - 16α,17α - oxido - 4 - pregnene - 3,20-dione 21-acetate; 11β,21-dihydroxy-16β-methyl-16α,17α-oxido-4-pregnene-3,20-dione 21-acetate, and 21-hydroxy - 16β - methyl - 16α,17α - oxido - 4 - pregnene - 3, 11,20-trione 21-acetate.

Example 4

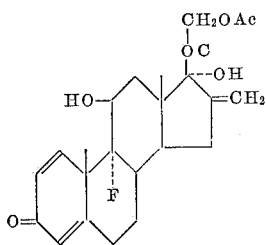

A solution of 600 mg. of 9α-fluoro-11β,21-dihydroxy-16β - methyl - 16α,17α - oxido - 1,4 - pregnadiene - 3, 20-dione 21-acetate in 18 ml. of benzene and 2.5 ml. trifluoracetic acid is maintained at 25° C. for 18 hours. Ethyl acetate (50 ml.) is added followed by sufficient 5% sodium carbonate to neutralize the acid present. The organic layer is washed with saturated aqueous sodium chloride, dried over magnesium sulfate and concentrated to dryness in vacuo. Crystallization of the residue from ethyl acetate leads to the desired 9α-fluoro-11β,17α,21 - trihydroxy - 16 - methylene - 1,4 - pregnadiene-3,20-dione 21-acetate.

In a similar manner are prepared 11β,17α,21-trihydroxy - 16-methylene-1,4-pregnadiene-3,20-dione 21-acetate; 17α,21 - dihydroxy-16-methylene-1,4-pregnadiene-3,11,20-trione 21-acetate; 9α-fluoro-11β,17α,21-trihydroxy-16-methylene-4-pregnene-3,20-dione 21-acetate; 11β,17α, 21 - trihydroxy - 16 - methylene - 4 - pregnene - 3,20 - dione 21-acetate; and 17α,21-dihydroxy-16-methylene-4-pregnene-3,11,20-trione 21-acetate.

Alternatively, to a stirred solution of 600 mg. of 9α-fluoro - 11β,21 - dihydroxy - 16β - methyl - 16α,17α - oxido-1,4-pregnadiene-3,20-dione 21-acetate in 2.4 ml. of tetrahydrofuran is added 3.5 ml. of a 2:1 by weight mixture of hydrogen fluoride in tetrahydrofuran. After 2 hours at 15° the reaction mixture is pipetted slowly into excess cold aqueous sodium carbonate solution. The mixture is extracted with chloroform and the chloroform extract washed with water and saturated aqueous sodium chloride. Chromatography of the residue on neutral alumina also leads to the desired 9α-fluoro-11β,17α,21-trihydroxy - 16 - methylene - 1,4 - pregnadiene - 3,20 - dione 21-acetate.

Example 5

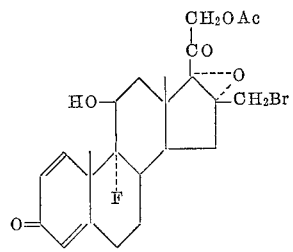

Three hundred mg. of the 9α-fluoro-11β,17α,21-trihydroxy - 16 - methylene-1,4-pregnadiene-3,20-dione 21-acetate prepared in Example 4 is mixed with 8 ml. of tertiary butyl alcohol. The mixture is stirred at 15° C., 1.5 cc. of water is then added followed by 265 mg. of N-bromosuccinimide. The reaction mixture is stirred at 25° C. for six hours. At the end of that time a few drops of 5% aqueous sodium sulfite is added to decolorize the reaction mixture and the solvent is removed under vacuum. About 10 cc. of water is then added and the crystalline residue is washed with water and dried to yield the 9α - fluoro-11β,21-dihydroxy-16-bromomethyl-16α,17α-oxido-1,4-pregnadiene-3,20-dione 21-acetate.

In a similar manner when the corresponding 16-alkylene steroid is substituted in the above preparation, there are obtained 11β,21-dihydroxy-16-bromomethyl-16α,17α-oxido-1,4-pregnadiene-3,20-dione 21-acetate; 21-hydroxy-16α,17α-oxido-16-bromomethyl-1,4-pregnadiene - 3,11,20-trione 21-acetate; 9α-fluoro-11β,21-dihydroxy-16α,17α-oxido-16-bromomethyl-4-pregnene-3,20-dione 21-acetate; 11β,21-dihydroxy-16α,17α-oxido-16-bromomethyl-4 - pregnene-3,20-dione 21-acetate; and 21-hydroxy-16α,17α-oxido-16-bromomethyl-4-pregnene-3,11,20-trione 21-acetate.

When N-chlorosuccinimide is substituted in equivalent quantities for N-bromosuccinimide in any of the above preparations, the corresponding 16-chloroalkyl compound is obtained.

Example 6

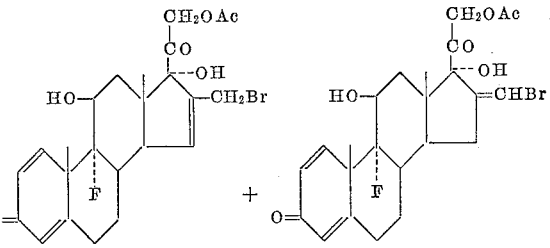

To a stirred solution of 800 mg. of the 16-haloalkyl-16α,17α-oxide (product of Example 5) in 10 ml. of glacial acetic acid at 15° C. is added 10 ml. of 7% hydrogen chloride in acetic acid at 15°. (Alternatively, similar results are obtained with 800 mg. of 16-halomethyl-16α,17α-oxide in 5 ml. of acetone and 1 ml. of concentrated hydrochloric acid cooled to 10–15°.) In either case after 20 minutes at 10–15° water is added and the solid product is filtered, washed with water and dried in air to give a mixture of the corresponding Δ15-16-halomethyl and 16-halomethylene steroids. This mixture is separated into its components by chromatography on Whatman #3 filter paper (40 mg. per 6″ x 20″ sheet) utilizing formamide as the stationary phase and chloroform benzene 1:9 as the mobile phase. The appropriate band (visible under ultraviolet light) is cut out, eluted with methanol, and the methanol concentrated to dryness in vacuum. Water is added to the residue, the solid filtered, washed with water and dried in air. Pure crystalline material is obtained in each case by crystallization from ethyl acetate-hexane or acetone-ether. Thus, when the 16-bromalkyl-16α,17α-oxide product of Example 5 is used, the product obtained is a mixture of 9α-fluoro-11β, 17α, 21-trihydroxy, 16-bromomethyl-1,4,15-pregnatriene-3,20-dione 21-acetate, and 9α-fluoro-11,17α,21-trihydroxy-16-bromomethylene-1,4-pregnadiene-3,20-dione 21-acetate which is separated as described above.

In a similar manner, the corresponding Δ¹⁵-16-chloromethyl and 16-chloromethylene compounds are prepared by starting with the corresponding 16α,17α-oxides prepared in Example 5.

*Example 7*

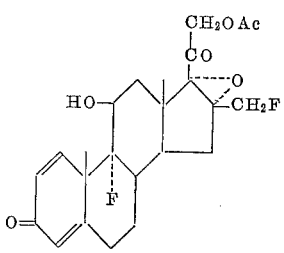

To the 16-bromalkyl-16α,17α-oxide (200 mg.) (product of Example 5) in 10 ml. of acetonitrile is added 500 mg. of silver fluoride. The reaction mixture is refluxed under nitrogen for 4 hours, cooled and concentrated to dryness in vacuo. Water is added and the mixture extracted with ethyl acetate. The organic extract is washed with 50% saturated sodium chloride solution, dried over magnesium sulfate and the solvent removed in vacuo. The residue is slurried in water and filtered to yield the corresponding 16-fluoromethyl-16,17-oxido steroid purified by crystallization from ethyl acetate-hexane. When any of the other 16-bromoalkyl products of Example 5 are similarly treated in the above procedure, the corresponding 16-fluoromethyl compound is obtained.

*Example 8*

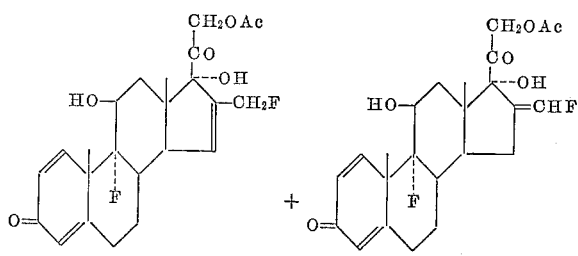

The product of Example 7 is used in the procedure of Example 6 in place of the starting material in that procedure to yield a mixture of 9α-fluoro-11β,17α,21-trihydroxy-16-fluoromethyl-1,4,15-pregnatriene-3,20-dione 21-acetate and 9α-fluoro-11β,17α,21-trihydroxy-16-fluoromethylene-1,4-pregnadiene-3,20-dione-21-acetate. The components of the mixture are separated by paper chromatography as described in Example 6. Similarly any of the other 16-bromoalkyl products of Example 5, treated by the procedure of Example 7 and then by the procedure of Example 6, give the correspondingly substituted Δ¹⁵-16-fluoromethyl and 16-fluoromethyl steroids.

*Example 9*

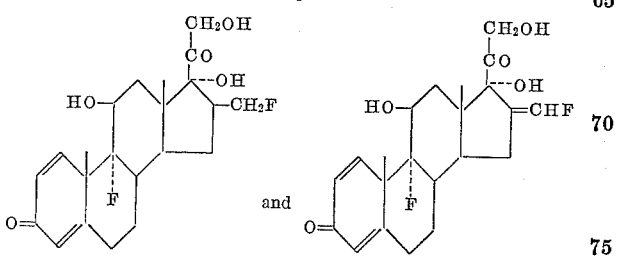

Either compound is obtained by treatment of 200 mg. of the corresponding 21-acetate (the product of Example 8) in 10 ml. of methanol with 200 mg. of potassium bicarbonate in 3 ml. of water under nitrogen at reflux for 10 minutes. The mixture is cooled, neutralized with 0.3 ml. of acetic acid in 5 ml. of water, the methanol removed in vacuo and the product extracted into ethyl acetate. Concentration of the ethyl acetate gives respectively 9α-fluoro-11β,17α,21-trihydroxy - 16 - fluoromethylene-1,4-pregnadiene-3,20-dione or 9α-fluoro-11β,17α,21 - trihydroxy-16-fluoromethyl-1,4,15-pregnadiene-3,20-dione depending on the starting material used.

In a similar manner may be obtained 11β,17α,21-trihydroxy - 16 - fluoromethylene - 1,4 - pregnadiene-3,20-dione; 17α,21-dihydroxy - 16 - fluoromethylene-1,4-pregnadiene-3,11,20-trione; 9α-fluoro - 17α,21 - dihydroxy-16-fluoromethylene - 4 - pregnene-3,11,20-trione; 9α-fluoro-11β,17α,21-trihydroxy - 16 - fluoromethylene-4-pregnene-3,20-dione; 17α,21-dihydroxy - 16 - fluoromethylene-4-pregnene-3,11,20-trione; and 11β,17α,21-trihydroxy-16-fluoromethylene - 4 - pregnene-3,20-dione and the corresponding 16-fluoromethyl-Δ¹⁵-compounds.

By the same procedure, the free 21-hydroxy steroids corresponding to the 21-acetoxy compounds of Example 6 are prepared.

We claim as our invention:

1. Compounds of the formula:

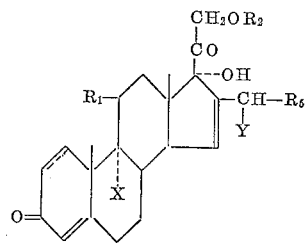

in which $R_1$ is selected from the group consisting of β-hydroxyl and keto, $R_2$ is selected from the group consiting of hydrogen and lower alkanoyl, X is selected from the group consisting of hydrogen and halogen, Y is halogen, $R_5$ is hydrogen, and the dotted line between carbons 1 and 2 indicates a selection from the group consisting of a $C_1$–$C_2$ double bond and a $C_1$–$C_2$ single bond.

2. 16-fluoromethyl-4,15-pregnadiene - 11β,17α,21 - triol 3,20-dione.

3. 16 - fluoromethyl-1,4,15-pregnatriene,11β,17α,21 - triol 3,20-dione.

4. 16 - fluoromethyl-1,4,15-pregnatriene,17α,21 - diol 3,11,20-trione.

5. 9α-fluoro - 16 - fluoromethyl-4,15-pregnadiene,11β, 17α,21-triol 3,20-dione.

6. 9α-fluoro - 16 - fluoromethyl-1,4,15-pregnatriene,11β, 17α,21-triol-3,20-dione.

7. 9α-fluoro - 16 - fluoromethyl-1,4,15-pregnatriene,17α, 21-diol-3,11,20-trione.

8. 9α-fluoro - 16 - bromomethyl-1,4,15-pregnatriene,11β, 17α,21-triol-3,20-dione.

9. 9α-fluoro - 16 - chloromethyl-1,4,15-pregnatriene,11β, 17α,21-triol-3,20-dione.

10. Compounds of the formula

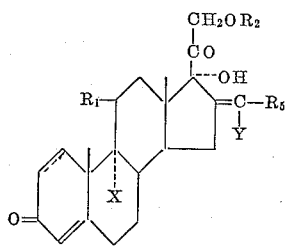

in which $R_1$ is selected from the group consisting of β-hydroxyl and keto, $R_2$ is selected from the group consiting of hydrogen and lower alkanoyl, X is selected from the group consisting of hydrogen and halogen, Y is halogen, $R_5$ is hydrogen, and the dotted line between carbons 1 and 2 indicates a selection from the group consisting of a $C_1$–$C_2$ double bond and a $C_1$–$C_2$ single bond.

11. $11\beta,17\alpha,21$-trihydroxy - 16 - fluoromethylene-4-pregnene-3,20-dione.

12. $11\beta,17\alpha,21$-trihydroxy - 16 - fluoromethylene-1,4-pregnadiene-3,20-dione.

13. $17\alpha,21$-dihydroxy - 16 - fluoromethylene-1,4-pregnadiene-3,11,20-trione.

14. $9\alpha$-fluoro - $11\beta,17\alpha,21$ - trihydroxy-16-fluoromethylene-4-pregnene-3,20-dione.

15. $9\alpha$-fluoro - $17\alpha,21$ - dihydroxy-16-fluoromethylene-4-pregnene-3,11,20-trione.

16. $9\alpha$-fluoro - $11\beta,17\alpha,21$-trihydroxy-16-fluoromethylene-1,4,-pregnadiene-3,20-dione.

17. $9\alpha$-fluoro - $17\alpha,21$ - dihydroxy-16-fluoromethylene-1,4-pregnadiene-3,11,20-trione.

18. $9\alpha$-fluoro - $11\beta,17\alpha,21$ - trihydroxy - 16 - chloromethylene-1,4-pregnadiene-3,20-dione.

19. The process of preparing compounds of the structure

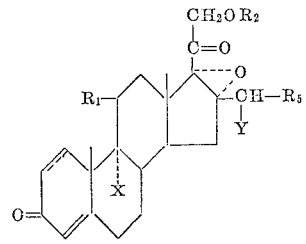

in which $R_1$ is selected from the group consisting of $\beta$-hydroxyl and keto, $R_2$ is selected from the group consisting of hydrogen and lower alkanoyl, X is selected from the group consisting of hydrogen and halogen, Y is halogen, $R_5$ is hydrogen, and the dotted line between carbons 1 and 2 indicates a selection from the group consisting of a $C_1$–$C_2$ double bond and a $C_1$–$C_2$ single bond, which comprises agitating a solution of the corresponding 16-alkylidenyl-17$\alpha$-hydroxy steroid in an aqueous alcoholic solvent with an N-halosuccinimide, in which the halogen is selected from the group consisting of bromine and chlorine and isolating the resultant 16-haloalkyl-16$\alpha$,17$\alpha$-epoxy steroid.

20. The process of producing compounds of the structure:

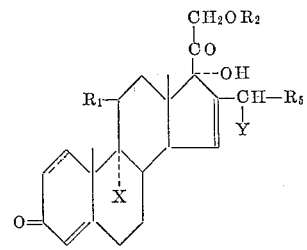

and compounds of the structure:

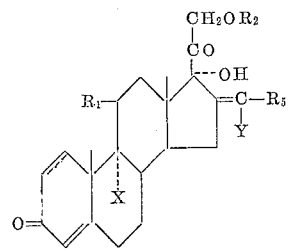

in which $R_1$ is selected from the group consisting of $\beta$-hydroxyl and keto, $R_2$ is selected from the group consisting of hydrogen and lower alkanoyl, X is selected from the group consisting of hydrogen and halogen, Y is halogen, $R_5$ is hydrogen and the dotted line between carbons 1 and 2 indicates a selection from the group consisting of a $C_1$–$C_2$ double bond and a $C_1$–$C_2$ single bond which comprises converting the corresponding 16-haloalkyl-16$\alpha$,17$\alpha$-epoxy steroid wherein said halo group is selected from the group consisting of chloro and bromo by refluxing it in acetonitrile solution with silver fluoride and isolating the 16-fluoroalkyl-16$\alpha$,17$\alpha$-epoxy steroid, converting the said 16-fluoroalkyl-16$\alpha$,17$\alpha$-epoxy steroid to a mixture of 16-fluoroalkylidenyl-17$\alpha$-hydroxy-steroid and $\Delta^{15}$-16-fluoroalkyl - 17$\alpha$ - hydroxy steroid by stirring in a solution of HCl in an organic solvent, isolating said mixture and separating the two products.

No references cited.